United States Patent [19]

Hofmann

[11] Patent Number: 4,794,937

[45] Date of Patent: Jan. 3, 1989

[54] PLUG COUPLING

[75] Inventor: Manfred Hofmann, Altendiez, Fed. Rep. of Germany

[73] Assignee: Hydrotechnik GmbH, Fed. Rep. of Germany

[21] Appl. No.: 15,652

[22] Filed: Feb. 17, 1987

[30] Foreign Application Priority Data

Feb. 17, 1986 [DE] Fed. Rep. of Germany ..... 86101979

[51] Int. Cl.[4] .............................................. F16L 37/28
[52] U.S. Cl. .............................. 137/614.05; 285/133.1; 285/137.1
[58] Field of Search ......................... 285/137.1, 133.1; 137/614.05, 236.1

[56] References Cited

U.S. PATENT DOCUMENTS

| 4,082,112 | 4/1978 | Schmidt | 137/614.03 |
| 4,253,488 | 3/1981 | Leverberg | 137/382 |
| 4,367,888 | 1/1983 | Leverberg et al. | 285/137.1 |
| 4,453,566 | 6/1984 | Henderson, Jr. et al. | 137/614.02 |
| 4,460,156 | 7/1984 | Hazelrigg et al. | 285/137.1 |
| 4,486,060 | 12/1984 | Currall | 137/614.05 |
| 4,495,967 | 1/1985 | Needham et al. | 285/137.1 |

FOREIGN PATENT DOCUMENTS

| 78589 | 2/1975 | Australia . | |
| 1255417 | 11/1967 | Fed. Rep. of Germany ... | 285/137.1 |
| 2242715 | 8/1972 | Fed. Rep. of Germany . | |
| 2537407 | 8/1975 | Fed. Rep. of Germany . | |
| 2845925 | 4/1980 | Fed. Rep. of Germany ... | 285/137.1 |
| 2756084 | 6/1980 | Fed. Rep. of Germany . | |
| 3141475 | 10/1981 | Fed. Rep. of Germany . | |

Primary Examiner—A. Michael Chambers
Attorney, Agent, or Firm—Robert J. Koch

[57] ABSTRACT

A manually operating plug and socket joint for multiple hose connections, particularly measuring, control or regulating lines of fluid systems with very high (several hundred bar), reduced or alternating pressure. The plug and the socket have a housing with axially parallel bores receiving a joining bushing with a radial clearance. A spring loaded and mechanically actuable check valve with a cylindrical valve body is arranged in each joining bushing. The valve body outer edge or frontal face sealing shoulder presses against an elastomeric gasket. The joining bushing or a sealing bush located in the bushing and the gasket define a sealable flow channel. Each mechanically actuable plug piece check valve contains a shackled flying piston with a passage bore. The piston outlet nipple opens the cylindrical valve body of the associated socket piece mechanically actuable check valve. The piston inlet nipple opens the cylindrical valve body of the plug piece mechanically actuable check valve. A second flow channel seal is arranged in each mechanically actuable check valve, downstream and/or upstream relative to the gasket. Release of the second flow channel seal of each check valve is delayed following release of the gasket from the sealing shoulder upon opening the cylindrical valve body by the flying piston nipples.

11 Claims, 3 Drawing Sheets

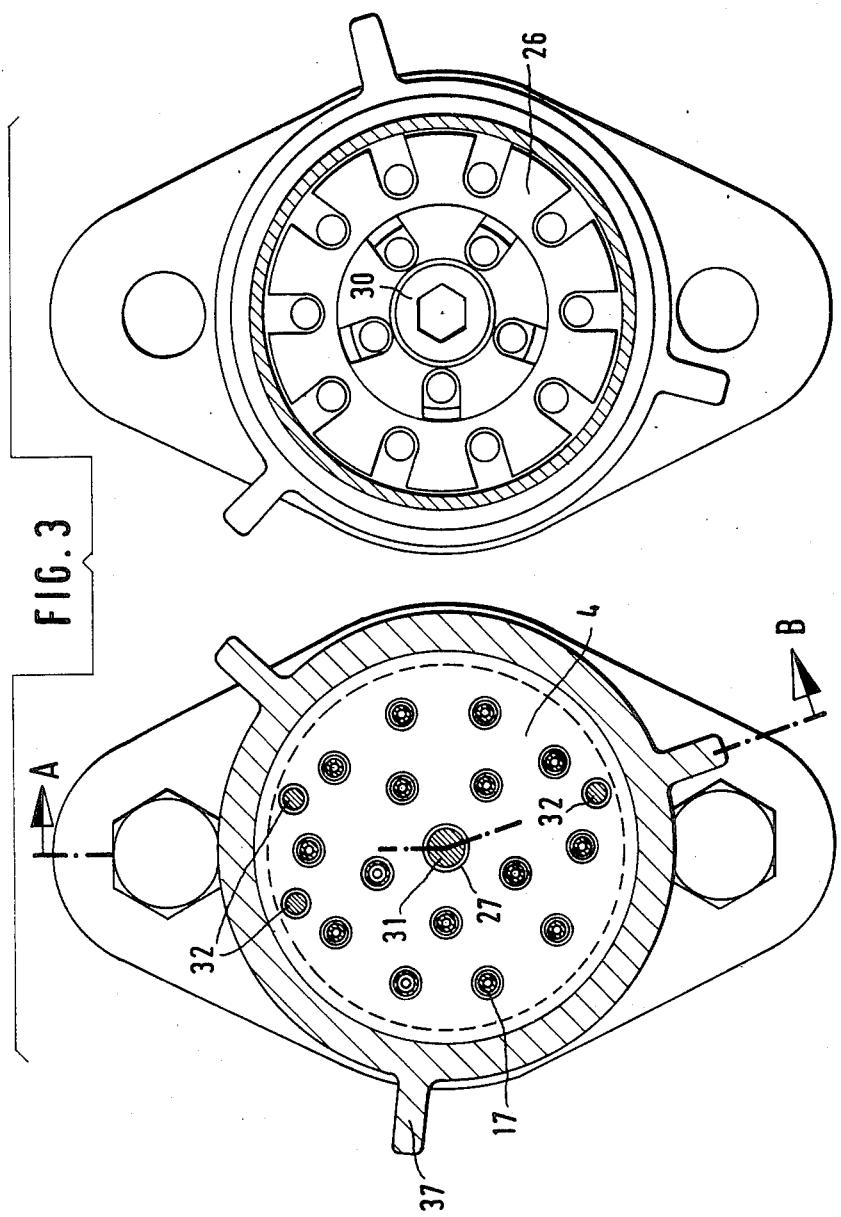

PLUG COUPLING

BACKGROUND OF THE INVENTION

1. Field of the Invention

The invention concerns a plug coupling for several hose connections, in particular for measuring, control or regulating lines of fluidic systems with high pressures of several hundred bar or low and varying pressures, for manual actuation, consisting of a plug piece and a socket piece.

2. Description of the Related Technology

Valve couplings, in particular valve measuring couplings for fluid systems with a high working pressure are arleady known; they consist of a coupling bushing under line pressure, in which a spring loaded and mechanically actuable check valve is located.

Valve couplings of this type are used, for example to establish testing or measuring connections to pressure lines, wherein usually the coupling bushing is installed fixedly with external threads on the pressure line of for example a hydraulic or pneumatic system. For the duration of the test or measuring operation a sealing nipple in the form of a hollow pin is screwed on by means of a union nut, said sealing nipple being fixedly joined to a hose. The couplings may be connected, for example under pressure, i.e. without deactivating the installation, by means of measuring lines with the corresponding measuring instruments. In case of the connection of fixedly installed devices, for example manometers, manometer selection switches and pressure switches, the flexible measuring hose may be laid in a manner similar to electric cables, so that no expensive pipe installation is necessary. By means of such measuring couplings the effective working pressures may be read directly on the hydraulic apparatus, without the need for the loosening of deration screws and screwed pipe connections.

Couplings of this type are employed in connection with highly different structural elements and controls of hydraulic or pneumatic systems. Following the release of the coupling connection, a protective cap is screwed onto the coupling bushing in order to prevent the penetration of dirt into the bushing of the coupling and to effect an additional sealing function in case the check valve installed in the bushing is not entirely tight.

Valve couplings of the aforementioned type known, for example from DE No. 27 56 084, wherein the valve bodies are in the form of cones or spheres. In this known valve coupling the valve body is arranged as a check valve on a compression spring, displaceable by said spring and comprising on its upper end a flow channel. The valve coupling is equipped with a gasket which also prevents rotation, the sealing function of which is, however, assured only if a corresponding hose or closure cap is screwed securely onto the bushing of the coupling with its sealing nipple.

If said cap is loosened or if such a cap does not exist at all—as for example in the case of a selective manometer switch—the pressure medium is sealed off only by the corresponding check valve. However, check valves for high pressure couplings of this type have as a result of their design a more or less strongly perceived lack of tightness and cannot be manufactured in series to be entirely tight in actual practice.

For hose connections in general hydraulics and for gas filling devices of hydraulic reservoirs such a design is adequate, but even here complaints relative to inadequate tightness are being encountered, if for example the caps are loosened on several valve couplings simultaneously to test several measuring locations simultaneously in succession with a measuring device, when in the case of hydraulic reservoirs, gas pressure testing devices are used without refilling means, or if the valve couplings are used to monitor combustible gases, etc.

The use of such valve couplings is not possible at all for selective manometer switches because there is constant leakage at the connections not in use. Attempts have already been made in connection with the aforementioned valve couplings to provide the check valve with rubber elastic seals or conventional O rings, but in spite of adequate initial tightnesses, positive results are not always obtained. With long measuring lines and large dead volumes in manometers or in the circulation connected with them, and particularly in the case of low viscosity liquids or high operating pressures, or in testing devices for hydraulic reservoirs, the hydraulic seal may be washed out due to the very strong flow of the medium present at the seal, generated by the large pressure difference created by the lifting of the valve.

SUMMARY OF THE INVENTION

A valve coupling, preferably a measuring valve coupling has therefore been proposed for fluid systems with high operating pressures and media having different viscosities. Measures are proposed to protect seals of elastic materials against cavitation and washouts and to eliminate the effect of large volumes in measuring lines or the like, of the circulation, on the elastomeric seal, wherein in a valve coupling a cylindrical body which in the closed state of the valve is pressing with its outer edge and/or the frontal surface of its sealing shoulder, against a gasket consisting of an elastomeric material, forms a sealable flow channel together with the bushing of the coupling or a sealing bush located in said bushing, while further seals are located downstream and/or upstream from said gasket, which during the opening motion of the valve body discontinue their sealing function only after the gasket has been raised from the sealing shoulder, preferably in a delayed manner. This measures assures the throttling of the flow generated by the large difference in pressure immediately after the release of the elastomeric gasket from its valve shoulder, or the flow may even be completely arrested.

The decrease in the sealing function of the seals located downstream and/or upstream from the gasket during the process of the lifting of the valve body takes place over a longer stroke path, compared to the decrease in the sealing function of the gasket. In this manner, the seals provided downstream and/or upstream from the gasket are still performing their sealing function, while in view of its shorter stroke, the gasket is protected against the harmful effect of the flow that otherwise would be generated, and against cavitation and possible washouts.

The use of hydraulic installations in combination with other system components and of electrohydraulic elements requires in case of a failure or defective operation the rapid and accurate diagnosis of the condition, so that the state of certain structural groups may be determined immediately. This requires the acquisition of the pressure measuring data of as many components as possible within a short period of time, preferably simultaneously. The aforedescribed measuring couplings are especially suitable for the purpose. The couplings are installed at strategically important measuring points of an installation and optionally combined on a shield by means of measuring lines. To actually perform the measurements, the high pressure lines must be connected individually with the single measuring points. The result is that the connections are often effected erroneously and false measurements are produced. Furthermore, the measuring instruments connected may be damaged or destroyed, if the measured values obtained are not compatible with the measuring range of the instrument.

Measuring couplings are further known which may be actuated manually at low system pressures only. In the case of high pressure systems the coupling process may be carried out by machine only, or else the system must be relieved of its pressure prior to the coupling process.

It is the object of the invention to provide a plug coupling which utilizes the advantages of the monocoupling already proposed and develops it into a multiple coupling, in order to combine measuring, control or regulating points in a hydraulic system or a system with fluid components, at different locations of the system and to transmit the pressures determined through a multiple line, in a manner such that the measurements—acquired at different points of the system—may be carried in a central location and—if necessary—also simultaneously.

This object is attained by that according to the invention both the plug and the socket part are provided with a housing comprising a plurality of axially parallel bores to receive a coupling bushing each with a radial clearance and that in each coupling bushing a spring loaded and mechanically actuated check valve with a cylindrical valve body is located, with said valve body pressing with the outer edge and/or frontal surface of its sealing shoulder against a gasket in the closed state of the valve, said gasket forming together with the coupling bushing or a sealing bush located in the coupling bushing a sealable flow channel, and that each check valve of the plug part comprises a captive flying piston provided with a passage bore, the outlet nipple whereof is designed to lift the cylindrical valve body of the associated, mechanically actuated check valve of the socket part and the inlet nipple whereof to raise the valve body of the check valve of the plug part.

In a further development of the invention the flying piston comprises an outer stop shoulder to limit its depth of penetration into the associated valve of the socket piece and an inner stop shoulder to limit the depth of penetration into the subsequent valve, wherein each bore in the housing of the plug part is equipped on the outlet side with a back off recess to limit the axial movement of the flying piston.

In each check valve of the socket and the plug piece additional flow channel seals are located downstream and/or upstream from the gasket consisting of an elastomeric gasket, with said seals discontinuing their sealing function during the lifting of the valve body by the inlet or outlet nipple of the flying piston only after the lifting of the gasket from the sealing shoulder, preferably in a delayed manner.

Advantageously, each coupling bushing comprises at its outlet side a retaining ring resting against a shoulder of a hose nipple and being held by a single or multiple part perforated disk restrained by a union joint.

The housing of the socket piece and its perforated disk comprise a center bore in which a centering pin is located to center the perforated disk.

The perforated disk of the plug piece has a threaded center bore, in which a clamping bolt is located to hold the perforated disk and which is equipped with a threading and centering pin extending into the housing of the plug piece.

The frontal sides of the housing of the socket and the plug piece are provided with radially acting coding pins, which during the coupling process enter defined coding bores.

In an advantageous manner, the centering pin projects further from the housing of the plug piece than the coding pins.

The plug piece comprises a rotating threaded sleeve with inner threads and the outer side of the housing of the socket piece is provided on the outside with a thread engaging the inner thread of the threaded sleeve.

BRIEF DESCRIPTION OF THE DRAWINGS

The invention will become more apparent from the figures. In the drawing:

FIG. 3 a section E-F and C-D according to FIG. 1.

DETAILED DESCRIPTION OF THE PREFERRED EMBODIMENTS

In the different drawings and views identical elements are provided with identical reference symbols, while similar elements are designated by the same numbers and by indices.

Figure 1:
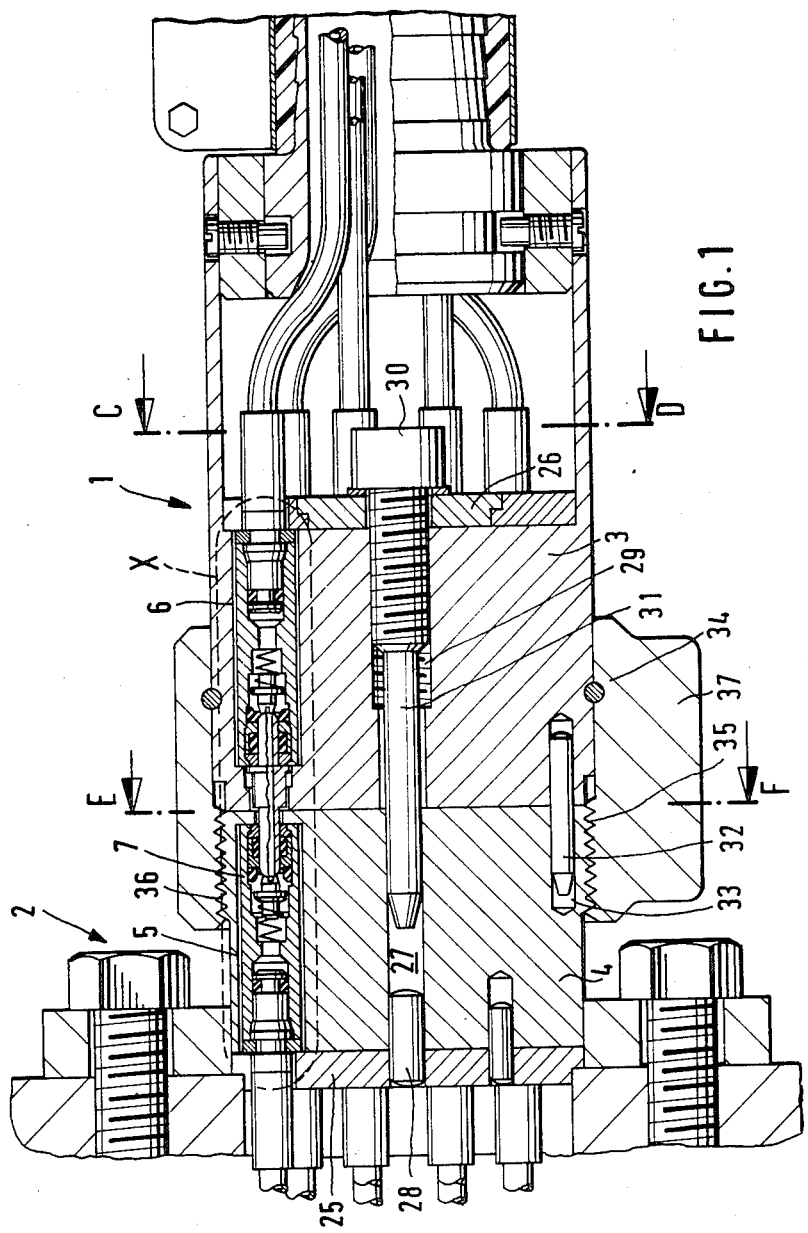
FIG. 1 shows a longitudinal section through a plug piece and a socket piece joined to it.

FIG. 1 shows a plug piece 1 coupled with a socket piece 2. The plug piece 1 comprises a housing 3 and in a corresponding manner, the socket piece 2 has a housing 4. Both housings 3 and 4 are provided with a plurality of axially parallel bores 5 and 6, each to receive a coupling bushing 7 or 7' with a radial clearance 8 and 8'. The coupling bushings 7' of the plug piece 1 are similar to the coupling bushings 7 of the socket piece 2, so that initially a coupling bushing 7 in the socket piece 2 is described. Simultaneously, reference is made to FIG. 2 also.

In each of the coupling bushings 7 a spring loaded and mechanically actuated check valve 9 with a cylindrical valve body 10, is located. The valve body 10 presses with the outer edge and/or the frontal surface of its sealing shoulder 11 in the closed state of the valve against a gasket 12, which together with the coupling bushing 7 or a sealing bush 13 located in the coupling bushing, forms a sealable flow channel 14.

The same elements are also located in the coupling bushing 7' of the plug piece 1. However, each mechanically actuated check valve 9' of the plug piece 1 comprises a captive flying piston 16 provided with a passage bore 15, the outlet nipple 17 whereof serves to lift the cylindrical valve body 10 of the associated mechanically actuated check valve 9 of the socket piece 2 and its inlet nipple 18 to lift the cylindrical valve body 10' of the mechanically actuated check valve 9' of the plug piece 1, said nipples being designed accordingly.

The flying piston 16 is provided with an outer stop shoulder 19 to limit the depth of its penetration into the associated mechanically actuated check valve 9 of the socket piece 2.

The flying piston is further provided with an inner stop shoulder 20 to limit its depth of penetration into the subsequent, mechanically actuated check valve 9' of the plug piece 1. Each bore 5 in the housing of the plug piece 1 is equipped with a back off recess 21 to limit the axial motion of the flying piston 16.

In each of the mechanically actuated check valves 9 and 9' of the socket piece 2 and the plug piece 1, respectively, downstream and/or upstream from the gasket 12 and 12', a further flow channel seal 22 and 22' is arranged, which upon the lifting of the cylindrical valve body 10 and 10' by the inlet or outlet 18 and 17 of the flying piston 16 during the coupling process discontinue their sealing function only after the lifting of the gasket 12 and 12' from the sealing shoulder 11 and 11', in a delayed manner.

Each coupling bushing 7 is equipped at its outlet side with a retaining ring 23 and 23' resting against a collar 24 and 24' of the corresponding hose nipple and being held by a single or multiple perforated disk 25 and 26, secured by threading (FIG. 3).

The housing 4 of the socket piece 2 and its perforated disk 25 are provided with a center bore 27, in which the centering pin 28 is located for the centering of the perforated disk 25.

The housing 3 of the plug piece 1 is provided with a threaded center bore 29 in which a clamping bolt 30 is located to secure the perforated disk, said bolt 28 being equipped with a threading and centering pin 31 extending into the housing of the plug piece 1. In the joined state the centering pin 31 of the plug piece 1 extends into the bore 27 of the socket piece 2, whereby the threading process and centering are assured. In order to obtain this, the centering pin 31 projects farther out of the housing 3 of the plug than the coding pins 32, intended to assure the correct radial correlation.

To assure the radial alignment of the plug piece with the socket piece, the frontal sides of the housings 3 and 4 of the socket and plug pieces 1 and 2 carry radially acting coding pins 32, which in the course of the joining process engage defined coding bores 33.

The plug piece 2 is further provided with a rotatable threaded sleeve 34 with inner threads 35 and the outside of the housing 4 of the socket piece 2 is equipped with threading 36 engaging the inner threading 35 of the threaded sleeve 34.

The rotatable threaded sleeve 34 further comprises at its circumference a plurality of radially oriented wings 37.

Figure 2:
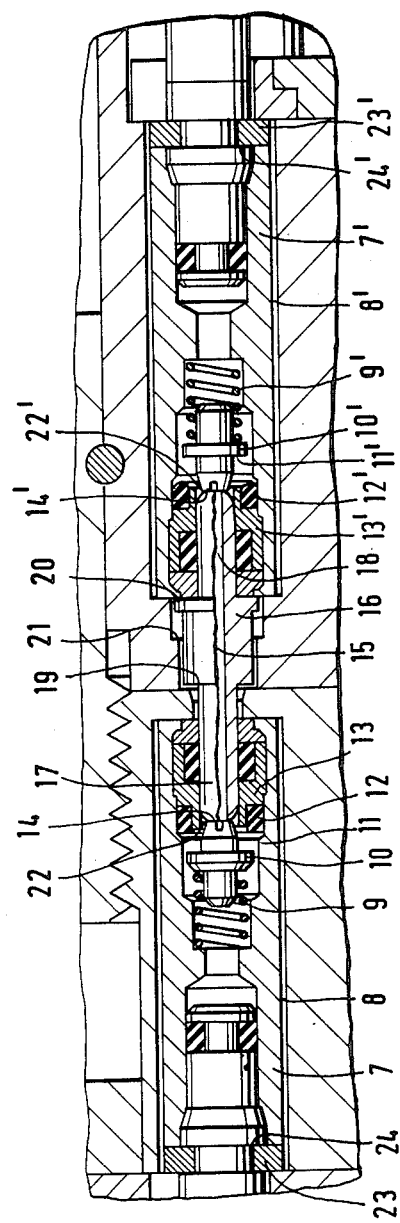
FIG. 2 an enlarged view of a segment indicated in FIG. 1 by X.

As seen in FIG. 2, the frontal side and the outer edge of the sealing shoulder 10 and 10' are pressing in the closed state of the valve against the gasket 12 and 12' made of an elastomeric material. Downstream from the gasket 12 and 12' the valve body 10 and 10' forms together with the an annular land of the sealing bush 13 and 13' a seal in the form of the throttle path.

If the valve body 10 is raised by means of the outlet nipple 17 of the flying piston 16, the gasket 12 is lifted off the sealing shoulder 11 of the valve body 10, while the seal in the form of a throttle path maintains its sealing effect until the annular land of the sealing bush 13 leaves the conical upper part of the valve body 10. The inlet nipple 18 of the flying piston 16 is acting in a similar manner on the valve body 10'.

The avoidance of a flow or the reduction of the velocity of the medium flowing past the flow channel seal 22 prevent a washout or the cavitation of said seal. Consequently, the entire sealing system is applicable even in the case of extremely high pressures and for gases, wherein by the correlation and layout of the different seals a very long life of the device is assured.

The invention makes it possible to connect a plurality of measuring, control and regulating lines of a fluid system by means of a line equipped with plug coupling with a central measuring or control station, where the measuring and control values acquired may be centrally processed.

I claim:

1. A manually operated high and reduced pressure multiple hose measuring control and regulating line connection plug coupling comprising:

a plug and a socket piece each exhibiting a housing with a plurality of axially parallel bores, coupling bushings arranged in said parallel bores with a radial clearance, a spring loaded and mechanically actuated check valve with a cylindrical valve body located within each coupling bushing wherein each valve body has a closed position where a sealing shoulder disposed on said body contacts a gasket or sealing bushing sealing surface disposed within said coupling bushing and defining a sealable flow channel;

a captive flying piston axially displaceable over a limited range exhibiting a longitudinal passage bore, arranged in each parallel bore of said plug piece, said pistons exhibiting a protruding outlet nipple of sufficient length to mechanically actuate a corresponding socket piece check valve upon insertion and an opposing inlet nipple of sufficient length to mechanically actuate an associated plug piece check valve;

a second flow channel seal arranged in each mechanically actuated check valve of the socket and the plug pieces between said cylindrical valve body and said sealing bushing wherein said second flow channel seal is elongated so that during joining of said plug and socket pieces the second flow channel seal opening is delayed from said cylindrical body sealing shoulder release.

2. Plug coupling according to claim 1, wherein said flying piston exhibits an outer stop shoulder positioned to limit depth of penetration into the associated mechanically actuated socket piece check valve, and an inner stop shoulder positioned to limit depth of penetration into the corresponding mechanically actuated plug piece check valve and wherein each bore in said plug piece exhibits a back off recess on an outlet side arranged to limit axial motion of the flying piston.

3. A plug coupling according to claim 2, wherein each plug and coupling piece further comprises:

a retaining ring disposed against hose nipple collar receiving area of each coupling bushing in each bore; and a threaded perforated disk arranged to secure said retaining rings.

4. A plug coupling according to claim 3, further comprising a first centering pin received in a center bore in said socket piece housing and perforated disk.

5. A plug coupling according to claim 4, wherein said plug piece exhibits a central bore at least partially threaded and further comprising a second centering pin exhibiting a threaded clamping bolt portion, and extending through and fixing the plug piece perforated disk, wherein said second centering pin extends into said socket piece center bore.

6. A plug coupling according to claim 5, wherein said plug and socket pieces exhibit aligned radial acting coding bores; and further comprising coding pins received in said coding bores.

7. A plug coupling according to claim 6 wherein said second centering pin extends farther than the coding pins.

8. A plug coupling according to claim 7, further comprising:
   outer threads disposed on said socket piece; and
   an internally threaded rotating sleeve connected to said plug piece engaging said outer threads.

9. A plug coupling according to claim 8, wherein said rotating sleeve further comprised a plurality of circumferentially disposed radially oriented wings.

10. A plug coupling according to claim 1, further comprising:
   outer threads disposed on said socket piece; and
   an internally threaded rotating sleeve connected to said plug piece engaging said outer threads.

11. A plug coupling according to claim 10, wherein said rotating sleeve further comprised a plurality of circumferentially disposed radially oriented wings.

* * * * *